(12) United States Patent
Wan et al.

(10) Patent No.: US 9,469,529 B2
(45) Date of Patent: Oct. 18, 2016

(54) FIBER BASED SENSOR AND THE FABRICATING METHOD THEREOF

(71) Applicant: National Tsing Hua University, Hsinchu (TW)

(72) Inventors: De-Hui Wan, Hsinchu (TW); Shih-Yu Tseng, Hsinchu (TW); Chung-Yao Yang, Hsinchu (TW); Szu-Ting Lin, Hsinchu (TW); Chao-Min Cheng, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 19 days.

(21) Appl. No.: 14/665,539

(22) Filed: Mar. 23, 2015

(65) Prior Publication Data
US 2016/0107341 A1    Apr. 21, 2016

(30) Foreign Application Priority Data

Oct. 16, 2014    (TW) .............................. 103135899 A

(51) Int. Cl.
| | |
|---|---|
| *G01N 21/75* | (2006.01) |
| *B82Y 30/00* | (2011.01) |
| *B29C 70/00* | (2006.01) |
| *B29C 70/64* | (2006.01) |
| *B29C 70/02* | (2006.01) |
| *B29K 29/00* | (2006.01) |
| *B29K 401/00* | (2006.01) |
| *B29K 505/14* | (2006.01) |

(52) U.S. Cl.
CPC ................ *B82Y 30/00* (2013.01); *B29C 70/00* (2013.01); *B29C 70/025* (2013.01); *B29C 70/64* (2013.01); *B05D 2401/32* (2013.01); *B29K 2029/04* (2013.01); *B29K 2401/00* (2013.01); *B29K 2505/14* (2013.01)

(58) Field of Classification Search
CPC ..... B82Y 30/00; B29C 70/025; B29C 70/64; B29C 70/00; B05D 2401/32; B29K 2029/04; B29K 2401/00; B29K 2505/14
See application file for complete search history.

(56) References Cited

FOREIGN PATENT DOCUMENTS

| | | |
|---|---|---|
| CN | 103344622 A | 10/2013 |
| TW | I300478 B | 5/1990 |

OTHER PUBLICATIONS

J. Anker et al., "Biosensing wth plasmonic nanosensors" 2008 Nature Publishing Group, vol. 7, Jun. 2008, pp. 442-453.
Yun Jv et al., "Positively-charged gold nanoparticles as peroxidase mimic and their application in hydrogen peroxide and glucose detection" The Royal Society of Chemistry 2010, Chem. Commun, 2010, 46, pp. 8017-8019.
Liana, Devi D., et al. "Recent Advances in Paper-Based Sensors". Sensors, Received: Jul. 12, 2012, Published: Aug. 23, 2012, ISSN 1424-8220, www.mdpi.com/journal/sensors.
Office Action from Taiwan Patent Application No. 103135899 dated Jun. 3, 2016.

*Primary Examiner* — Dennis M White
(74) *Attorney, Agent, or Firm* — Patterson + Sheridan, LLP

(57) ABSTRACT

The present invention provides a fiber base sensor and the fabricating method thereof. More specifically, one of the main goals of the present invention is to solve the problem existing in the prior art of the failure of forming a plurality of nano-particles on the surface of the fiber base sensor evenly by utilizing self-assembly process with the nano-imprint process. Furthermore, the another goal of the present invention is to provide detail parameters required in the said nano-imprinting process for avoiding the efficiency drop caused by over-embedding the nano-particles into the fiber based sensor.

10 Claims, 4 Drawing Sheets

Fig.2A
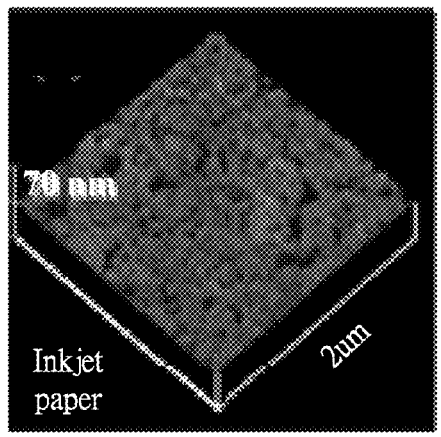
FIG.2B
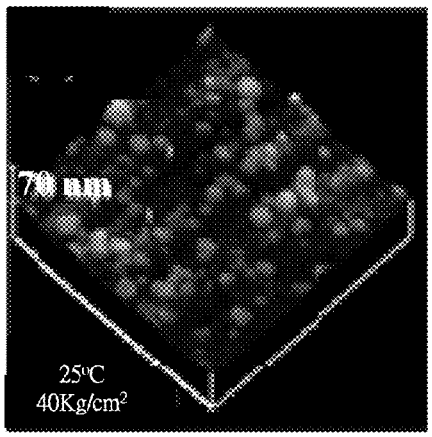
FIG.2C
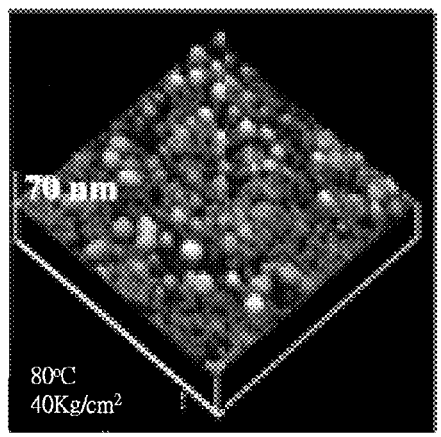
FIG.2D
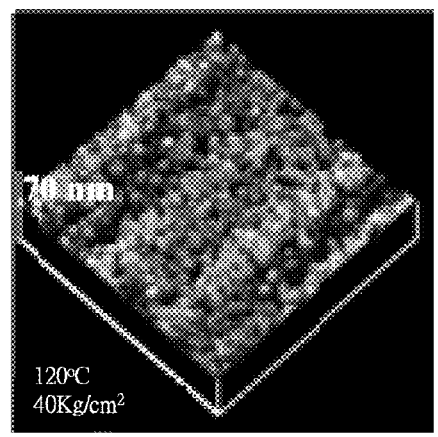
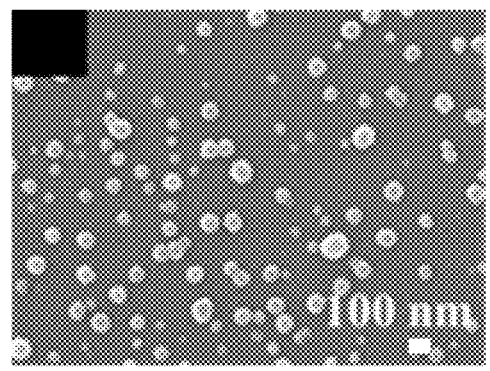
FIG.3

FIBER BASED SENSOR AND THE FABRICATING METHOD THEREOF

CROSS REFERENCE TO RELATED APPLICATION

This application claims priority to Taiwan Patent Document No. 103135899, filed on Oct. 16, 2014 with the Taiwan Patent Office, which is incorporated by reference in its entirety.

BACKGROUND OF THE INVENTION

1. Field of the Invention

The present invention relates to a fiber based sensor and the fabricating method thereof; more particularly, to a fiber based sensor formed by the nano material forming evenly on the fiber material by the nano-imprint process with specific parameters.

2. Description of the Prior Art

The food preservatives keep the food from spoiling to extend the expiration date, and the main advantage of the food preservatives is to prevent food poisoning. Most processed foods contain food preservatives, and the major food preservatives are sulfite, formaldehyde, borax, sulfur dioxide and nitrate.

In the past, in order to detect the chemical materials mentioned above, people mainly immerse the paper into the liquid oxidase to allow the oxidase to be absorbed uniformly in the paper for manufacturing test papers. When applying the conventional test paper, the designated element of the object under test reacts with the oxidase in the test paper to make the oxidase in the test paper to change color, which then further allows the user to know if the object under test contains the designated element for detection.

However, the conventional oxidase test paper has many defects like short storage period, poor heat resistance, large amounts of usage due to bad optical absorption and large amounts of the test papers for the immersion process.

To overcome the problems mentioned above, Yun Jv, Baoxin Li and Rui Cao, Positively-charged gold nano-particles as per oxidiase mimic and their application in hydrogen peroxide and glucose detection, Chem. Commun., 2010, 46, 8017, disclosed that the nano-gold particle has the similar function of the oxidase without the defects thereof. According to this, the applicant tries to utilize the nano-gold particles to replace the oxidase to manufacture the test paper.

In the development period, by applying the said method to manufacture the test paper, the applicant found that the nano-particles cannot distribute themselves uniformly on the surface of the paper before chemical modification. For example, the liquid nano-particles will be assembled on the surface of the paper, which then makes the nano-particles to contact with the object under test inefficiently and then lose the activity of detection. However, the efficiency of the chemical modification is unobvious because the fiber material like papers and fabrics usually have lower chemical activity. Accordingly, it is ineffective to utilize the conventional liquid adsorption method to manufacture the test paper.

In another aspect, like J. N. Anker, W. P. Hall, O. Lyandres, N. C. Shah, J. Zhao, R. P. Van Duyne, Nat. Mater. 7 (2008) 442, revealed that the method of manufacturing the chemical detective test paper by utilizing the metal nano-particles with high cost and complicated procedures, which is unable to produce large quantities and commercialize.

The conventional problems above mentioned are the present techniques of the method of the fiber base sensor in the invention.

SUMMARY OF THE INVENTION

After many tests and experiments, the inventor finds a solution to solve that the nano-particles cannot be distributed on the media efficiently and evenly, which is considered to be the content of the present invention.

Briefly, the present invention provides a technique that utilizes a nano-imprint process to make nano-particles distribute themselves evenly and efficiently on the test papers. The present invention is preparing a base, a work table, and fiber material. The surface of the base has nano-gold particles, wherein the nano-gold particles are formed and distributed evenly by a self-assembly process. Then, the layer of nano-particles on the mold is imprinted on the surface of the fiber material by using the methods of low-temperature and high-pressure to get the goal of uniform distribution.

In the said nano-imprinting process, if the pressure or the temperature is over qualified, the efficiency of the detection drops caused by over-embedding the nano-particles into the surface of the fiber material, and then enables the contact area of the unit under test to become too small to react totally, which will affect the efficiency of the examination. To solve the problem, the invention discloses that when the diameter of the nano-particle is between 20 to 100 nanometers, the mold should consider the diameter of the nano-particle first, and then adjust the operational temperature to be between 25 to 85 degrees and the predetermined pressure to be between 20 to 60 kilograms per square centimeter, which will get the optimal effects.

To summarize, the present invention relates to a fiber based sensor and the fabricating method thereof, more particularly, to solve the problem that the nano-particles distributed on the fiber based sensor are formed unevenly, by the nano-imprint process and the self-assembly process. Furthermore, the another goal of the present invention is to provide detail parameters required in the said nano-imprinting process for avoiding the efficiency drop caused by over-embedding the nano-particles into the fiber based sensor.

BRIEF DESCRIPTION OF THE APPENDED DRAWINGS

Some of the embodiments will be described in detail, with reference to the following figures, wherein like designations denote like members, wherein:

FIG. 2A shows a schematic diagram of the photomicrograph of the fiber material without conducting the nano-imprinting process in the embodiment.

FIG. 2B to FIG. 2D shows a schematic diagram of the photomicrograph of the fiber material conducting the nano-imprinting process under the operational temperature is 25 degrees, 80 degrees and 120 degrees in the embodiment.

FIG. 3 shows a schematic diagram of the photomicrograph of the mold main body with nano-gold particles conducting the self-assembly process in the embodiment.

DETAILED DESCRIPTION OF THE INVENTION

The examples and explanations are mentioned below to well describe the features and spirits of the invention. More importantly, the present invention is not limited to the embodiment described herein. Those skilled in the art will readily observe that numerous modifications and alterations of the device may be made while retaining the teachings of the invention.

Figure 1A:
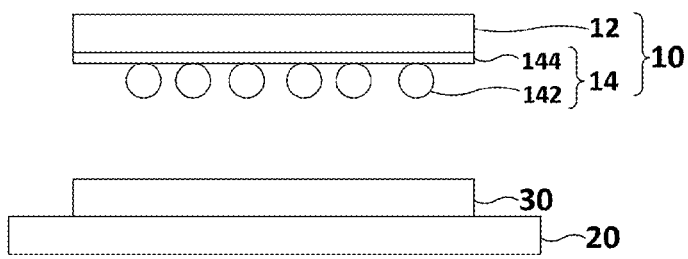
FIG. 1A to FIG. 1C show a schematic diagram of the method of producing the fiber base sensor in an embodiment of the present invention.
Figure 1B:
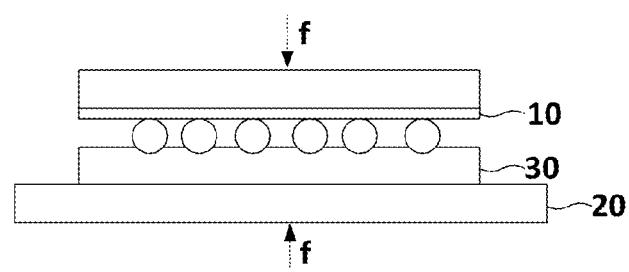
Figure 1C:
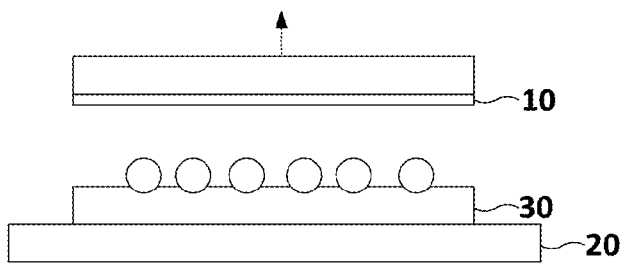
Figure 5:
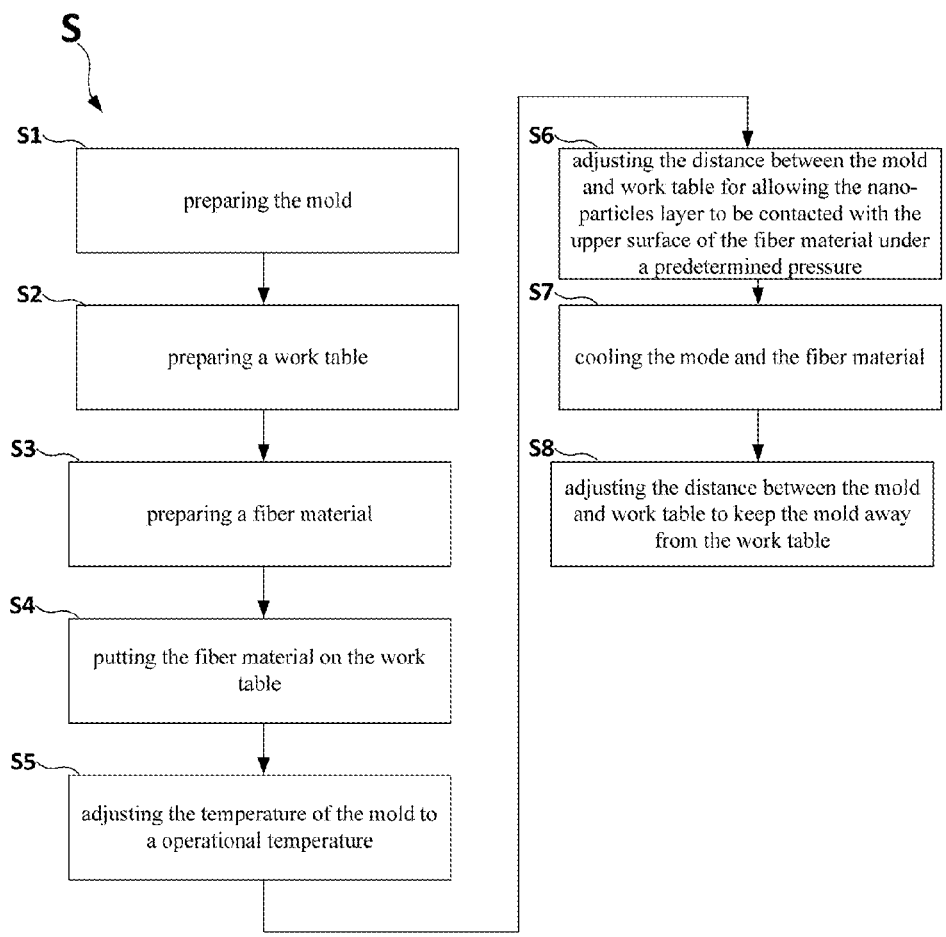
FIG. 5 shows a schematic diagram of the method of producing the fiber base sensor.

Firstly, the fabricating method of the fiber based sensor in this invention is described. Please refer to FIG. 1A to FIG. 1C. FIG. 1A to FIG. 1C are schematic diagrams illustrating the method of fabricating the fiber based sensor in an embodiment. FIG. 5 is a structure diagram illustrating the method of fabricating the fiber based sensor in the embodiment.

The following is the illustrations of the fabricating method S of the invention. Conduct S1 to S3 without sequence first, and then prepare the mold 10, the work table 20, and the fiber material 30 insequently. The work table 20 above mentioned refers to an element that the accuracy is able to adapt to the nano-imprint process (Reverse-nano printing/Nano imprint) and is allowed to be placed work piece pressured by the controllable press machines.

Figure 4:
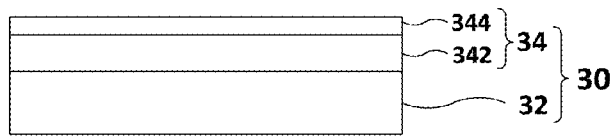
FIG. 4 shows a schematic diagram of the fiber material in the embodiment.

The fiber material 30 is a plate-shaped paper fiber, a fabric fiber like cotton or nylon, or other fibrous material. In the embodiment, the fiber material 30 is a paper fiber, with special structure. More particularly, please refer to FIG. 4. FIG. 4 is a schematic diagram illustrating the structure of the fiber material in an embodiment. As shown in the figure, the fiber material 30 contains the fiber material 30 comprising a substratum 32 and a polymeric material layer 34 disposed on the surface. The substratum 32 formed by the fiber utilizes the polymeric material layer 34 on the surface to get the waterproof function and absorb printing ink quickly. The polymeric material layer 34 comprises a polymeric substratum layer 342 and a coating layer 344 on the outer surface selectively. The main material of the polymeric substratum layer 342 and the coating layer 344 is PVA (Polyvinyl alcohol). Only the coating layer 344 comprises aluminum oxide to provide the above mentioned function. Please note that because most of the special papers of the ink-jet printers have the structure of the substratum 32 and the polymeric material layer 34 mentioned above, the user also can use the special papers of the ink-jet printers to be the fiber material 30 in the practical application like FIG. 2A. FIG. 2A is a photomicrograph illustrating the fiber material 30 without imprinting process. The lengths of the stray line on the Z-axis and the scan line are 70 nanometer and 2 micron respectively. Moreover, utilizing the structure considered in H. K. Lee, M. K., Joyce, P. D. Fleming, J. E. Cawthorne, Tappi Journal. 4 (2005) 11-16 to be the fiber material 30 is available.

Moreover, in the embodiment, the mold 10 comprises the mold main body 12, the mold main body 12 is the crystal substrate utilized in the nano-imprint process, the mold main body 12 formed by the crystal material like quartz substrate, silicon substrate or glass substrate. Utilize the self-assembly process to form the nano-particles layer 14 on the working surface of the mold main body 12 at first in actual practice. In this case, the nano-particles layer 14 at least comprises a plurality of the nano-particles 142 and an interface layer 144. Take the nano-particles 142 to be the nano-gold particles as an example. The self-assembly process is one of the methods that coats the working surface of the mold 10 with SAM (Self-Assembly Monomer) to be the interface layer 144 and immerse the mold 10 in the aqua solution with the nano-gold particles to make the surface of the mold 10 absorb a single layer of the nano-gold particles.

In the preferred embodiment, the density of the nano-gold particles on the mold main body 12 through the self-assembly process is 23 boxes per micrometer like FIG. 3. More particularly, FIG. 3 is the photomicrograph illustrating the mold main body with the nano-gold particles through the self-assembly process, and the length of the white cube at the bottom right of the photomicrograph is 100 nanometers to be the scale. In the practical application, when the density of the nano-gold particles is between 5 and 200 boxes per micrometer, it will have a better effect.

After preparing the elements, it is time for the imprinting process. First, carry S4 to put the fiber material 30 on the work table 20. Then, carry S5 to utilize the element like electrical heating element to adjust the temperature of the mold to an operational temperature. Next, carry S6 to adjust the distance between the mold 10 and the work table 20 for allowing the nano-particles layer 14 on the mold 10 to be contacted with the upper surface of the fiber material 30 under a predetermined pressure. After that, carry S7 to cool the mold and the fiber material. Finally, carry S8 to adjust the distance between the mold and work table to keep the mold away from the work table for transferring the nano-particles layer to the polymeric material layer of the fiber material for the fabrication of the fiber base sensor.

Please note that in the nano-imprinting process, the nano-particles will over-embed into the surface of the fiber material when the pressure and the temperature is over-high, and make the contact area of the object under test too small to react totally, which finally affects the efficiency of the examination. Accordingly, the operational temperature, the predetermined pressure, and the diameter of the nano-particles are correlated. In the preferred embodiment, the average diameter of the nano-particles is about 60 nanometers, the operational temperature is about 85 degrees, and the predetermined pressure is about 40 kilograms per square centimeter to make the nano-particles up to the fiber material about 34 nanometers high after the nano-imprinting process, which allows the nano-particles to fully react with the unit under test. Moreover, the heights exposed from the fiber material after the nano-particles through the nano-imprinting are 34 nanometers, 32 nanometers, and 13 nanometers respectively under the operational temperature 25 degrees, 80 degrees, and 120 degrees, on the premise that the diameter of the nano-particles and the predetermined pressure is the same. Please refer to FIG. 2B to FIG. 2D, which are the photomicrographs illustrating the fiber material under the operational temperature 25 degrees, 80 degrees, and 120 degrees after the nano-imprinting process in the particular embodiment. In general, the diameter of the nano-particles embedded in the polymeric material layer is advised to be less than the 70 percent of the average to get the better efficiency.

Moreover, when the diameter of the particles is between 20 to 100 nanometers, the operational temperature of the mold should be set between 25 to 120 degrees coping with the predetermined pressure from 20 to 60 kilograms per square centimeter to get a better efficiency.

After finishing the nano-imprinting process, utilize air cooling to cool the mold and the fiber material, and adjust the distance between the mold and work table to keep the mold away from the work table for transferring the nanoparticles layer to the polymeric material layer of the fiber material for the fabrication of the fiber base sensor.

Figure 6:
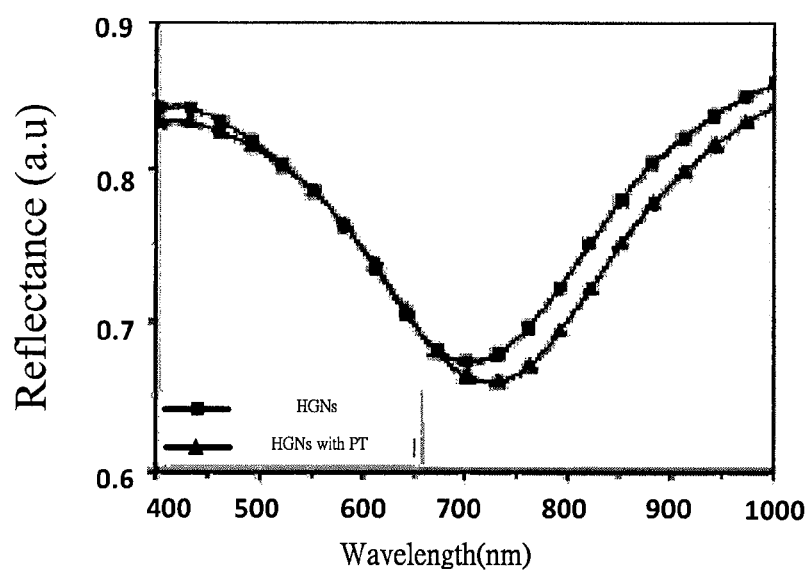
FIG. 6 illustrates the variety of the optic character when applying the fiber base sensor.

At last, to reveal the efficiency of the fiber base sensor, please refer to FIG. 6. FIG. 6 illustrates the variety of the optic character when applying the fiber base sensor. Specifically speaking, when the fiber base sensor of the invention reacts with Putrescine (PT) of the biogenic amine, the wavelength detected by the spectrometer shifts from 704 nanometers to 724 nanometers. It can be seen that the optic character of the fiber base sensor will vary by the unit under test.

In general, the present invention provides a fiber base sensor and the fabricating method thereof. More specifically, one of the main goals of the present invention is to solve the problem existing in the prior art of the failure of forming a plurality of nano-particles on the surface of the fiber base sensor evenly by utilizing self-assembly process with the nano-imprint process. Furthermore, the other goal of the present invention is to provide detail parameters required in the said nano-imprinting process for avoiding the efficiency drop caused by over-embedding the nano-particles into the fiber based sensor.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the meets and bounds of the appended claims.

What is claimed is:

1. A fiber based sensor fabricating method, comprising the following steps of:
    preparing a mold, a work surface of the mold having a nano-particles layer, wherein the nano-particles layer is formed on the work surface through a self-assembly process;
    preparing a work table;
    preparing a fiber material, comprising a substratum and a polymeric material layer disposed on the surface of the work table;
    putting the fiber material on the work table;
    adjusting the temperature of the mold to an operational temperature;
    adjusting the distance between the mold and work table for allowing the nano-particles layer to be contacted with the upper surface of the fiber material under a predetermined pressure;
    cooling the mold and the fiber material; and
    adjusting the distance between the mold and work table to keep the mold away from the work table for transferring the nano-particles layer to the polymeric material layer of the fiber material for the fabrication of the fiber base sensor.

2. The fiber based sensor fabricating method of claim 1, wherein the mold is quartz substrate, silicon substrate or glass substrate, and the fiber material is a paper fiber or a fabric fiber.

3. The fiber based sensor fabricating method of claim 1, wherein the nano-particles layer comprises a plurality of nano-gold particles.

4. The fiber based sensor fabricating method of claim 1, wherein the diameter of the nano-gold particle is between 20 to 100 nanometers.

5. The fiber based sensor fabricating method of claim 1, wherein the operational temperature is between 25 to 85 degrees.

6. The fiber based sensor fabricating method of claim 5, wherein the predetermined pressure is between 20 to 60 kilograms per square centimeter.

7. The fiber based sensor fabricating method of claim 1, wherein the polymeric material layer comprises polyvinyl alcohol (PVA) and aluminum oxide.

8. A fiber based sensor, comprising:
    a fiber material, comprising a polymeric material layer; and
    a nano-particles layer, embedded on the fiber material, wherein the nano-particles layer comprises a plurality of nano-particles, the nano-particles layer is formed on the polymeric material layer through the method mentioned in claim 1, the diameters of the plurality of the nano-particles is between 20 to 100 nanometers, and the part of the plurality of nano-particles ambushed under the polymeric material layer is smaller than 70% of the diameter of the nano-particles.

9. The fiber based sensor of claim 8, wherein the nano-particles layer is a single layer nano-particles array, and the nano-particles is nano-gold particles.

10. The fiber based sensor of claim 8, wherein the layer of the polymeric material comprises polyvinyl alcohol (PVA) and further comprising aluminum oxide.

* * * * *